US012745755B2

(12) United States Patent
Timsit et al.

(10) Patent No.: US 12,745,755 B2
(45) Date of Patent: Sep. 29, 2026

(54) METHOD FOR MONITORING THE FEEDING AND WATER CONSUMPTION OF AN ANIMAL

(71) Applicant: Ceva Santé Animale, Libourne (FR)

(72) Inventors: Edouard Timsit, Libourne (FR); Frédéric Bérier, Libourne (FR); Devan Lharidon, Libourne (FR)

(73) Assignee: CEVA SANTE ANIMALE, Cedex (FR)

( * ) Notice: Subject to any disclaimer, the term of this patent is extended or adjusted under 35 U.S.C. 154(b) by 827 days.

(21) Appl. No.: 17/927,925

(22) PCT Filed: Jun. 1, 2021

(86) PCT No.: PCT/EP2021/064618
§ 371 (c)(1),
(2) Date: Nov. 28, 2022

(87) PCT Pub. No.: WO2021/245056
PCT Pub. Date: Dec. 9, 2021

(65) Prior Publication Data
US 2023/0345915 A1 Nov. 2, 2023

(30) Foreign Application Priority Data
Jun. 1, 2020 (EP) .................................... 20177674

(51) Int. Cl.
*A01K 29/00* (2006.01)
*A01K 15/00* (2006.01)
*G01S 13/02* (2006.01)
*G01S 13/88* (2006.01)

(52) U.S. Cl.
CPC ........ *A01K 29/005* (2013.01); *G01S 13/0209* (2013.01); *G01S 13/88* (2013.01); *A01K 15/003* (2013.01)

(58) Field of Classification Search
CPC ...... A01K 29/005; A01K 15/003; G01S 13/04
See application file for complete search history.

(56) References Cited

U.S. PATENT DOCUMENTS 9,903,944 B2 * 2/2018 Peacock .................. G01S 13/04
11,330,803 B2 * 5/2022 Ehrman ............... A01K 15/023
11,709,087 B2 * 7/2023 Ceolato ................... G01S 17/08
250/577
11,937,572 B2 * 3/2024 Watanabe ............ A01K 13/003
(Continued)

FOREIGN PATENT DOCUMENTS

CA 3085608 A1 6/2019

OTHER PUBLICATIONS

International Search Report for corresponding PCT Application No. PCT/EP2021/064618 mailed Aug. 31, 2021.

*Primary Examiner* — Magdalena Topolski
*Assistant Examiner* — Katherine Anne Kloecker
(74) *Attorney, Agent, or Firm* — Wood, Phillips, Katz, Clark & Mortimer

(57) ABSTRACT

The present invention relates to a method for monitoring the feeding and water consumption of a bovine such as a cow. According to the invention, at least one sensor transported by the bovine is used to detect the presence of water and/or food in an area located in the muzzle of said animal and outside the body of said animal, in order to identify intake of food or water by said bovine.

17 Claims, 1 Drawing Sheet

(56) References Cited

U.S. PATENT DOCUMENTS

2019/0373857 A1* 12/2019 Leigh-Lancaster .......................... A01K 15/029
2020/0205381 A1* 7/2020 Wernimont .......... A01K 29/005

* cited by examiner

METHOD FOR MONITORING THE FEEDING AND WATER CONSUMPTION OF AN ANIMAL

TECHNICAL FIELD

The present invention relates to a method for monitoring the feeding and water consumption of an animal such as a cow.

It further relates to a device for monitoring the feeding and water consumption of such an animal.

PRIOR ART

It is known that bovines, in particular dairy cows, drink large quantities of water each day.

In one use, the amount of water drunk by a dairy cow depends directly on the level of dry material in its food ration, its age, the outside temperature, and the stage of milk production.

On each occasion, the ingestion of water by an adult cow can thus be between ten (10) and twenty (20) liters, with knowledge that a highly productive dairy cow may drink from one hundred and fifty liters (150 l) to two hundred and fifty liters (250 l) per day.

Although dairy cows can spend from four (4) to five (5) hours per day eating, they spend only twenty (20) to thirty (30) minutes per day drinking.

In order to ensure good hydration of the bovines, they must thus have access to a sufficient number of drinking troughs having a sufficient output to avoid any competition phenomenon which may halt the consumption of some animals, these drinking troughs being regularly cleaned in order to provide quality water.

It is also necessary for said drinking water to be regularly checked with regard to its bacteriological quality, and provided at a sufficient temperature, preferably between 5° C. and 15° C., both in summer and in winter.

Preferably, said drinking troughs are kept at a constant level in order to allow the bovines to put their muzzle in the water and thus ingest the amount of water required as quickly as possible.

A certain adaptation of these animals is noted if they do not drink the amounts of water necessary for their basic and metabolic needs, without the appearance of external signs which can alert the breeder.

However, this lack of water leads to priority choices in the region of the metabolism of the animal, ranging from a reduction in the milk or meat production to making the animal more susceptible to diseases.

Nowadays, in order to ensure adequate hydration of their bovines, a breeder must visually and individually monitor each of them.

It is also possible for said breeder to check certain hydration indicators such as the elasticity of the skin (skin-fold test), sunken eyes, or indeed the moisture of the mucous membranes of the animal.

However, such monitoring is difficult to envisage in breeding with a large number of bovines.

The same considerations apply for the feeding of a bovine.

It is thus known that a dairy cow has a daily energy requirement which depends on its milk production, its weight, its overweight status, its size, its lactation stage, and finally its age (primipara vs multipara). A dairy cow can thus have a dry material consumption which varies between fifteen (15) and thirty (30) kg per day, with an average value located around twenty-five (25) kg per day.

Here, too, the breeder has to ensure that each bovine receives sufficient food to cover its energy requirements, which cannot be done visually when the breeding includes a large number of bovines.

Devices are known from the prior art which make it possible to control the feeding of a cow, for example, by detecting the movements of the lower jaw of the animal associated with rumination, or indeed the noises caused by the chewing of food.

The detection of noises associated with swallowing water has also been proposed for monitoring the water consumption of a cow.

These portable devices of the prior art are particularly complex and heavy, and in fact represent a certain inconvenience for the animal, noticeably affecting its wellbeing.

Systems for individual weighing of an animal, aiming to determine the amount of food ingested, are also known. However, although very precise, these weighing systems require complex and costly installations.

There is thus a pressing need for a method and a device for monitoring the feeding and water consumption of a bovine, the original design of which makes it possible to overcome the disadvantages of the prior art set out above.

OBJECT OF THE INVENTION

The present invention aims to overcome the disadvantages of the prior art by proposing a monitoring method which is simple in its design and operating mode and which makes it possible to reliably determine the feeding or the water consumption by a bovine or a plurality of bovines.

The present invention also relates to a method of this kind which can be easily implemented in a use for monitoring breeding of bovines.

The present invention further relates to a method of this kind which reduces to a minimum any discomfort for the animal, or, even better, does not hinder its freedom of movement.

The present invention is also directed to a monitoring device such as a nose ring for implementing a monitoring method of this kind, which does not affect the wellbeing of the animal.

DISCLOSURE OF THE INVENTION

For this purpose, the invention relates to a method for monitoring the feeding and water consumption of a bovine such as a cow. According to the invention, at least one sensor transported by said bovine is used to detect the presence of water and/or food in an area located in the region of the muzzle of said animal and outside the body of said animal, in order to identify intake of food or water by said bovine.

This area can thus be placed in the immediate vicinity of the muzzle of the bovine, or indeed surround at least part of the muzzle of the bovine. Purely illustratively, said area can extend from zero (0) cm to thirty (30) cm around at least part of the muzzle of the bovine.

For example, said area of space may be located in the immediate vicinity of the end of the muzzle of said bovine.

Advantageously, said area can also be located "just in the region of," "level with," or indeed "very close" to the muzzle of the animal. This is the case when the animal has a portion of its muzzle in contact with said water or food.

Of course, the presence of water or food having been detected, if it is not possible to conclude an actual intake of food or water by said bovine on the basis of this detection alone, for example because said water or said food is not located level with the muzzle of the animal, it is possible to combine information originating from different sensors, worn or not by said animal, in order to identify, with certainty, said intake of water or food.

This particularly simple method makes it possible to reliably detect activities consisting in the intake of food or water by a bovine, and to thus ensure tracking of these activities over time in order to monitor the state of health of said animal.

Said method can in particular be used for detecting changes or difficulties in the eating and drinking habits in a bovine. Noting such changes or difficulties can be a relevant indicator of a change in the physiological state (e.g. heat, calving), an illness, and/or a reduction in the wellbeing of the animal. Moreover, a reduction in the ingestion of food or water may be associated with a reduction in the production (milk or meat).

It will be noted that the present method is particularly effective for monitoring the consumption of food, whether this be dry material (radar sensor) or food generally having a high moisture level (radar sensor and/or water detection sensor). It is also noted that, when a bovine eats, its muzzle and its nostrils are directly in contact with the food to be consumed, such that a nose ring equipped with electronic sensors and worn by said animal can ensure the detection of food or of water.

According to a particular embodiment of this method for monitoring the feeding and the water consumption of a bovine, said at least one sensor comprising a radar sensor, the following steps are performed:

- transmitting a radar signal at least in said area,
- receiving at least one reflection of the radar signal originating from an object located in said area in order to obtain data of said at least one object, and
- processing said data in order to determine the presence of water or food in said area.

A radar sensor of this kind advantageously makes it possible to determine the composition of each object located in said area, and thus to identify for example the type of food.

According to another particular embodiment of this method for monitoring the feeding and the water consumption of a bovine, a transmission antenna of said radar sensor configured to transmit an ultra-wideband radar signal transmits a radar signal into said area.

According to yet another particular embodiment of this method for monitoring the feeding and the water consumption of a bovine, said radar signal is transmitted in the form of coherent pulses.

According to yet another particular embodiment of said method for monitoring the feeding and the water consumption of a bovine, said bovine wearing a nose ring comprising at least one water detection sensor placed in the part of said ring located outside of the nostrils of the animal, detecting, by means of said at least one sensor, the immersion of said ring part in water, or the presence of water beyond a threshold value in the region of the end of the muzzle of said animal, in order to identify an intake of food or water by said bovine.

Said nose ring preferably bears the radar sensor and said at least one water detection sensor, which are separate and spaced apart from one another.

According to yet another particular embodiment of this method for monitoring the feeding and the water consumption of a bovine, one or more measurements are performed selected from the group comprising a measurement of the ambient pressure applied to said part of the ring, a measurement of the moisture level in the vicinity of said part of the ring, a measurement of the electrical conductivity in order to detect a variation in the conductivity between two electrodes that are spaced apart from one another, a measurement of the capacitance of the space separating two electrodes, in order to detect a variation in the capacitance of said space associated with the presence of water, and a measurement of the optical detection of water.

Said measurement or measurements can thus comprise:

- a measurement by means of a pressure gauge measuring the ambient pressure applied to the part of the ring. By way of example, when the bovine consumes water in a drinking trough having a constant level, the part of said ring is thus immersed together with the corresponding part of the end of the muzzle of the animal, and the water exerting a pressure on said part of can be detected,
- a measurement by means of a moisture sensor in order to measure the moisture level in the immediate vicinity of said part of the ring,
- a measurement of electrical conductivity in order to detect a variation in the electrical conductivity between two electrodes that are spaced apart from one another, this variation resulting from the space separating these two electrodes being filled with water originating from a drinking trough or a food rich in water,
- a measurement of the capacitance of the space separating two electrodes in order to detect a variation in the capacitance of said space associated with the presence of water, and
- a measurement of optical detection of water. A measurement of this kind can be performed according to different methods. Purely illustratively, it can be based on a total internal reflection of light. Light sources such as light-emitting diodes (LEDs) and a photodetector are placed inside a recess in the ring part. In the presence of water, a portion of the light is refracted by the water and is no longer reflected by the wall of the ring. The amount of light received by the photodetector is reduced, and the presence of water is thus detected.

Alternatively, it may be a case of detecting the interruption of a light beam passing through a transparent portion of the part of the ring, by water surrounding said ring part.

This or each of these measurements are advantageously compared with a previously defined threshold value, and the corresponding measurement is kept only when it is greater than said threshold value, in particular in order to prevent incorrect measurements, such as those resulting from a deposit, on the ring, of fine droplets of water associated with mist.

Thus, said threshold value is defined so as to eliminate measurements linked to the natural physiological state of the animal, such as the natural moisture of the end of the muzzle of the animal and/or possible incorrect measurements associated with the atmospheric conditions surrounding the animal, such as rain or fog.

According to another embodiment of this method for monitoring the feeding and the water consumption of a bovine, the location of the animal in the vicinity of a drinking trough and/or a feeding trough is also detected.

It is thus possible to determine the position of the animal with respect to a supply point for water or food, such as fodder. Depending on the detection method used, this positioning of the animal may be relative or absolute.

For example, it is possible to use one or more markers which make it possible to detect the position of the animal in the vicinity of this or at least one of these markers.

Advantageously, a measurement of the location of the animal is made via wireless communication with a Bluetooth®, infrared or near field (NFC) communication reader. The nose ring thus comprises an NFC tag or an RFID badge.

Said communication reader is directly placed or implanted in the drinking trough or the feeding trough.

Alternatively or in addition, the ring may be equipped with a global positioning system (GPS) receiver. It may also be an optical sensor for sensing the proximity of the animal.

Preferably, "proximity" means locating the animal at a distance smaller than a predetermined threshold distance from the object in question, such as a drinking trough or a feeding trough. It can then be considered that the animal is at the watering point, and is thus capable of drinking, or is at the feeding point, and is thus capable of eating.

According to yet another embodiment of this method for monitoring the feeding and the water consumption of a bovine, a movement of the head of the animal, in particular lowering of the head of said animal, is detected.

It may thus be envisaged to combine the information in order to guarantee, in an absolute manner, the effective intake of food or water by an animal. An embodiment of this kind is particularly useful when the reliability of one of the measurements could be affected, for example by the presence of significant dust in the air, or extreme environmental conditions such as heavy rain or indeed in the case of progressive accumulation of water associated with thick fog.

Purely illustratively, information associated with the presence of an animal in the vicinity of a drinking trough or a feeding trough could be coupled with measurements from said at least one water detection sensor or said radar sensor.

According to yet another embodiment of this method for monitoring the feeding and the water consumption of a bovine, the information associated with the presence of the animal in the vicinity of a drinking trough and/or a feeding trough, and a lowering of the head of the animal, are combined in order to trigger the measurement or measurements using said at least one water detection sensor or said radar sensor.

This ensures the relevance of the measurements and an optimization of the life of the battery embedded in the nose ring.

Alternatively again, the measurements could be made continuously when the animal is detected as being present in the vicinity of a drinking trough or a feeding trough, but only the measurements obtained during the detection that the animal has its head lowered will be taken into account.

According to yet another embodiment of this method for monitoring the feeding and the water consumption of a bovine, said radar sensor and/or said at least one water detection sensor having a sleep mode of low energy consumption, each sensor is placed in said mode when it appears that the animal is resting or is not located in the vicinity of a drinking trough and/or a feeding trough, or indeed that the head of said animal is not lowered towards the ground.

Advantageously, an embodiment of this kind makes it possible to minimize the energy consumption and to optimize the usage time of the battery embedded in the monitoring device, such as a nose ring.

Of course, the sensor for sensing the movement of the head of the animal, such as an accelerometer and/or the locating device, remain operational, or indeed active, when said at least one water detection sensor and/or said radar sensor are in their sleep mode.

According to yet another embodiment of this method for monitoring the feeding and the water consumption of a bovine, the movements of the muzzle of the animal are detected in order to identify chewing of food by said animal.

A bovine exhibits a particular movement of its jaws when it is feeding, which can be detected by means of an accelerometer (3 axes). Thus, the jaw movements associated with chewing or swallowing are advantageously detected in order to determine information on the activity of the animal regarding its feeding or its water consumption.

According to yet another embodiment of said method for monitoring the feeding and the water consumption of a bovine, the measurements provided by said radar sensor and/or said at least one water detection sensor are acquired over time, in order to determine a duration of water consumption or feeding of said animal.

According to yet another embodiment of this method for monitoring the feeding and the water consumption of a bovine, said measurements are processed by a central unit such as a microprocessor, worn by the animal, or are sent, via a wireless communication protocol, to a remote central unit.

In this latter case, the nose ring comprises a transmitter such as an antenna, for transmitting the measured data to the remote central unit.

According to yet another embodiment of this method for monitoring the feeding and the water consumption of a bovine, active compounds such as medication, vitamins, hormones, etc. are also delivered using said nose ring.

Purely illustratively, the active compound may be progesterone for a dairy cow, or indeed other hormones such as GnRH or PGF2alpha, melatonin, and parasiticides.

According to yet another particular embodiment of this method for monitoring the feeding and the water consumption of a bovine, prior to the measurement or measurements said animal has been identified in a unique manner.

According to yet another embodiment of this method for monitoring the feeding and the water consumption of a bovine, the amount of water drunk, or the amount of food ingested, by the bovine is estimated on the basis of the duration for which the animal, detected as being positioned in the vicinity of a drinking trough, or respectively a feeding trough, has kept its head lowered, and/or during which the presence of water or food has been detected, and/or during which the swallowing or the chewing of the animal has been identified by virtue of the detection of the movement of the jaws of the animal.

Advantageously, in order to carry out this estimation, it is possible to base this on a reference amount of water drunk, or respectively a reference amount of food ingested, during a period T by said animal, depending in particular on the age and the weight of the bovine in question.

Preferably, on the basis of these data, a daily amount of water drunk or food ingested by the bovine is estimated.

If this value is below a predefined threshold value for the bovine in question, taking into account its age and its weight, an alert is triggered.

It could also be useful to remotely read the volume of water delivered to the drinking trough during the time the animal is present, such as measured by a water meter with which said drinking trough is fitted, in order to adjust said amount of water drunk by the animal.

The detection of the movement of the animal's jaw can in particular be ensured by means of an accelerometer (3 axes)

which makes it possible to detect the activity and the movement of the head of the animal.

The present invention also relates to a device for monitoring the feeding and water consumption of a bovine such as a cow.

According to the invention, said monitoring device is portable and comprises:

a radar sensor comprising at least:

a transmission antenna arranged in a first position and configured to transmit a radar signal into an area outside of the body of the animal, a receiving antenna arranged in a second position that is different from and spaced apart from the first position, said receiving antenna being configured to receive the signals reflected by one or more objects placed in the area, and/or, a water detection sensor arranged so as to be placed outside the body of the animal when said animal is wearing said monitoring device, said water detection sensor being configured to detect the at least partial immersion of the monitoring device in water, or the presence of water beyond a threshold value outside of the body of said animal and in the region of the end of its muzzle, and a processing unit in order to identify, from measurements made by said radar sensor and/or said at least one water detection sensor, an intake of food or water by said bovine.

This area is preferably placed in the immediate vicinity of the muzzle of the bovine, or indeed surrounds at least part of the muzzle of the bovine. Purely illustratively, said area can extend from zero (0) cm to thirty (30) cm around at least part of the muzzle of the bovine.

For example, said area of space may be located in the immediate vicinity of the end of the muzzle of said bovine.

Advantageously, said area can also be located "just in the region of," "level with," or indeed "very close" to the muzzle of the animal. This is the case when the animal has a portion of its muzzle in contact with said water or food.

According to one embodiment of said monitoring device, said radar sensor is placed in a nose ring, a collar, or an ear tag.

Advantageously, the integration of the assembly of this or these different sensors on or in a nose ring makes the method for monitoring a bovine particularly simple and effective.

The animal is entirely free in its movements and is not hindered by portable apparatuses of the prior art, of a greater or lesser volume, restricting its head or its stomach.

According to another embodiment of this monitoring device, said transmission antenna is configured to transmit an ultra-wideband radar signal.

The radar signal is preferably transmitted in the form of coherent pulses.

By way of example, the usable scope of the radar sensor is between 0 and 4 m. A precision of 1 mm to 2 m distance can be achieved.

The orientation is 80° H-plane and 40° E-plane.

According to yet another embodiment of said monitoring device, said device being a nose ring, said at least one water detection sensor is placed in the part of said ring intended to be located outside the nostrils of the animal when said animal is wearing said nose ring, said at least one water detection sensor being configured to detect the at least partial immersion of said ring part in water, or the presence of water beyond a threshold value outside of the body of said animal and in the region of the end of its muzzle, in order to identify an intake of food or water by said bovine.

Advantageously, this or these sensors are selected from the group comprising a pressure gauge, a moisture sensor, an electrical conductivity measuring probe for detecting a variation in the conductivity between two electrodes that are spaced apart from one another, a probe for measuring the capacitance of the space separating two electrodes, in order to detect a variation in the capacitance of said space, and an optical sensor for detecting the presence of water on or in said ring part.

Preferably, said ring may comprise a plurality of said elements, which are for example placed in the central part of the body of the nose ring.

Said optical sensor may be configured to detect the total internal reflection of the light inside a portion of the nose ring, or said optical sensor may be configured to measure the light refracted by the water surrounding said ring part.

According to yet another embodiment of said monitoring device, it also comprises an accelerometer and/or a gyroscope and/or a device for locating said monitoring device in the vicinity of a drinking trough or a feeding trough.

By way of example, said locating device is configured to achieve wireless communication with a Bluetooth®, infrared or near field (NFC) communication reader.

According to yet another embodiment of this monitoring device, it is configured to deliver active compounds such as medication, vitamins, hormones, etc.

In a more general manner, the present invention also relates to a method for monitoring the feeding and water consumption of a bovine such as a cow, in which an intake of food or water by said bovine is identified by means of a radar sensor worn by said bovine.

A radar sensor of this kind makes it possible not only to detect food or water in an area in which it transmits a radar signal, but it also ensures the detection of the composition thereof. It also allows for the detection of food which would not contain a sufficient moisture level to be detected by a water detection sensor.

According to an embodiment of this method for monitoring the feeding and the water consumption of a bovine, the following steps are performed:

transmitting a radar signal in an area, receiving at least one reflection of the radar signal originating from an object located in said area in order to obtain data of said at least one object, and processing said data in order to determine the presence of water or food in said area.

Preferably, said area is outside the body of the animal.

According to another embodiment of this method for monitoring the feeding and the water consumption of a bovine, a transmission antenna configured to transmit an ultra-wideband radar signal transmits a radar signal into an area positioned in front of the head of the bovine.

According to yet another embodiment of this method for monitoring the feeding and the water consumption of a bovine, said radar signal is transmitted in the form of coherent pulses.

According to yet another embodiment of this method for monitoring the feeding and the water consumption of a bovine, said radar sensor is placed in a nose ring, a collar, or an ear tag.

Device for monitoring for monitoring the feeding and the water consumption of a bovine, comprising a radar sensor and a processing unit for identifying, on the basis of measurements made by said radar sensor, a consumption of food or water by said bovine.

According to an embodiment of said device for monitoring the feeding and the water consumption of a bovine, said radar sensor comprises a transmission antenna arranged in a first position and configured to transmit a radar signal into an area outside of the body of the animal, and a receiving antenna arranged in a second position that is different from and spaced apart from said first position, said receiving antenna being configured to receive the signals reflected by one or more objects placed in this area.

According to yet another embodiment of this device for monitoring the feeding and the water consumption of a bovine, said radar sensor is an ultra-wideband sensor.

According to yet another embodiment of this device for monitoring the feeding and the water consumption of a bovine, said device comprises a nose ring, a collar, or an ear tag comprising a recess for receiving said radar sensor.

According to yet another embodiment of said device for monitoring the feeding and the water consumption of a bovine, said device comprises one or more sensors for detecting the presence of water, selected from the group comprising a pressure gauge, a moisture sensor, an electrical conductivity measuring probe for detecting a variation in the conductivity between two electrodes that are spaced apart from one another, a probe for measuring the capacitance of the space separating two electrodes, in order to detect a variation in the capacitance of said space, and an optical sensor for detecting the presence of water on or in said device.

According to yet another embodiment of said device for monitoring the feeding and the water consumption of a bovine, said device also comprises an accelerometer and/or gyroscope and/or a device for locating said monitoring device in the vicinity of a drinking trough or a feeding trough.

BRIEF DESCRIPTION OF THE DRAWINGS

Other advantages, aims and particular features of the present invention will become clear from the following description, which is provided in the aim of explanation but is in no way limiting, with reference to the accompanying drawings, in which.

DESCRIPTION OF AN EMBODIMENT

The drawings and the description below mainly contain elements of a certain character. They can thus serve not only for better understanding of the present invention, but can also contribute to the definition thereof, if applicable.

Firstly, it is noted that the figures are not to scale.

Figure 1:
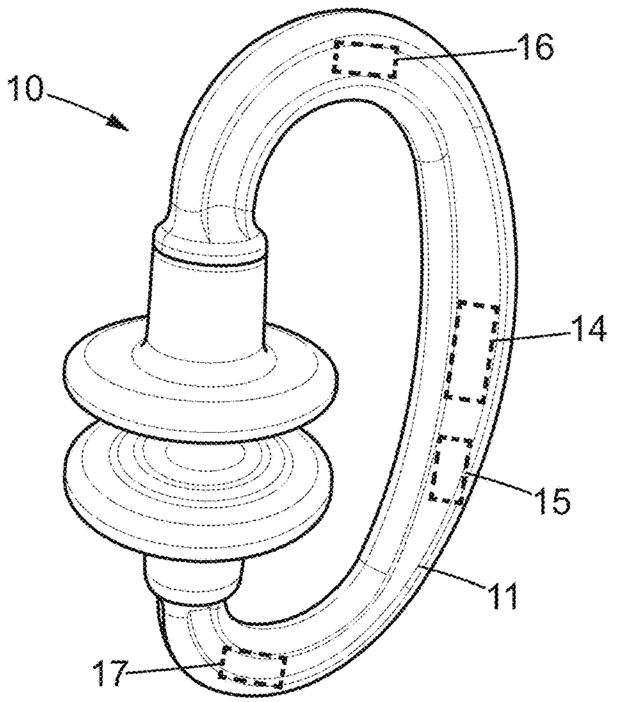
FIG. 1 is a perspective view of a nose ring for monitoring the feeding and the water consumption of a bovine according to a particular embodiment of the present invention.
Figure 2:
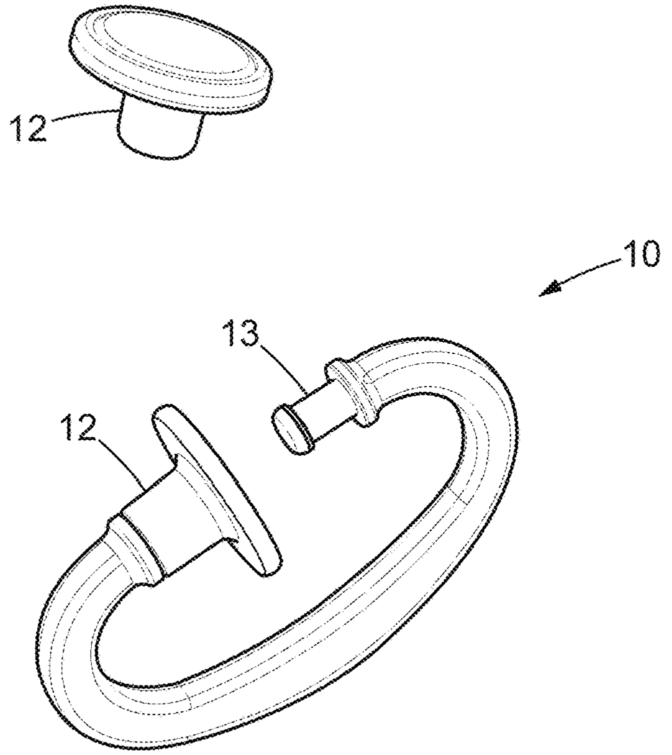
FIG. 2 is a partially exploded view of the nose ring of FIG. 1.

FIGS. 1 and 2 are schematic views of a nose ring 10 for monitoring the feeding and the water consumption of a bovine, such as a cow, according to a particular embodiment of the present invention.

Said nose ring 10 comprises a main body 11 which can be in the shape of a segment of an ellipsis or a rectangular portion. It is preferably formed of a plastics material such as a polymer.

Said body receives, at the ends thereof, pads 12 which are intended to come to rest against one nasal wall of the bovine in each case. Each pad 12 is advantageously mounted on a ball joint 13 so as to be pivotably movable and to adapt to the physiognomy of the animal.

The design of the body of the nose ring 10 makes it possible to enclose its nasal walls and to apply a slight pressure by means of said pads 12 in order to ensure that the ring is held in position.

Of course, said nose ring 10 could comprise a different type of fixing, such as a hook intended to pass through the nasal wall of the animal.

The central part of the body of the ring that is intended to be located outside of the nostrils of the animal, when said animal is wearing the nose ring, is hollow in order to receive a plurality of sensors.

Said central part thus receives a moisture sensor 14 which opens onto the outside and makes it possible to determine the moisture level immediately surrounding this part of the ring.

It further comprises a probe 15 for measuring electrical conductivity in order to detect a variation in the conductivity between two electrodes that are spaced apart from one another. Said variation results from the presence of the water filling the space separating the two electrodes.

The combination of information provided by said two sensors 14, 15 makes it possible to detect the immersion of said part of the nose ring 10 in water, or the presence of water beyond a threshold value outside of the muzzle and in the region of the end of the muzzle of said animal, in order to identify an intake of food or water.

A movement sensor such as an accelerometer 16 is also positioned inside the main body 11 of the ring in order to make it possible to obtain movement data of the head of the animal. It is thus possible to determine when an animal lowers its head to drink or eat.

The main body 11 of the ring is also provided with an NFC tag 17 for establishing wireless communication with a near-field communication (NFC) reader, thus making it possible to locate the animal with respect to a drinking trough, or a feeding trough, equipped with such readers.

The ring preferably further comprises a GPS sensor 18 which makes it possible to identify the behavior of the animal, in particular whether it is immobile. By combining this information with that originating from the accelerometer, it is thus possible to deduce therefrom if the animal is at rest, for example is sleeping.

Said nose ring is also configured to deliver active compounds such as medication, vitamins, etc.

What is claimed is:

1. A method for monitoring the feeding and water consumption of a bovine, the method comprising:

providing a bovine wearing a nose ring comprising at least one water detection sensor, wherein the at least one water detection sensor is positioned on a portion of the nose ring located outside of the nostrils of the bovine and in a region of the muzzle;

detecting, by the at least one water detection sensor, (i) immersion of the portion of the nose ring in water or (ii) a presence of water above a threshold value in the region of the muzzle; and identifying, based on the detecting, an intake of water or food by the bovine.

2. The method according to claim 1, further comprising:

transmitting, by a radar sensor, a radar signal into a region of the muzzle, receiving, by the radar sensor, at least one reflection of the radar signal from an object located in the region of the muzzle to obtain data representative of the object, and processing the data to determine the presence of water or food in the region of the muzzle.

3. The method according to claim 2, wherein the radar sensor comprises a transmission antenna configured to transmit an ultra-wideband radar signal, and wherein transmitting the radar signal comprises transmitting the ultra-wideband radar signal into the region of the muzzle.

4. The method according to claim 2, wherein the radar signal is transmitted in the form of coherent pulses.

5. The method according to claim 1, wherein detecting the presence of water comprises performing one or more of:

measuring ambient pressure applied to said partthe portion of the nose ring;

measuring a moisture level in the vicinity of the portion of the nose ring;

measuring electrical conductivity to detect a variation in the conductivity between two electrodes that are spaced apart from one another;

measuring capacitance of the space separating two electrodes to detect a variation in the capacitance of the space associated with the presence of water; or optically detecting the presence of water.

6. The method according to claim 1, wherein the threshold value is defined to exclude measurements associated with a natural physiological state of the animalbovine and/or possible incorrect measurements associated with atmospheric conditions.

7. The method according to claim 1, further comprising detecting a location of the bovine in a vicinity of a drinking trough and/or a feeding trough.

8. The method according to claim 7, further comprising providing a radar sensor, and further comprising combining information associated with (i) the presence of the bovine in a vicinity of a drinking trough and/or a feeding trough, and (ii) a lowering of a head of the bovine to trigger one or more measurements using the radar sensor and/or the at least one water detection sensor.

9. The method according to claim 1, further comprising detecting movement of a head of the bovine.

10. The method according to claim 1, further comprising providing a radar sensor, wherein the radar sensor and/or the at least one water detection sensor has a sleep mode of low energy consumption, and each sensor is placed in the sleep mode when the bovine is resting, is not located in a vicinity of a drinking trough and/or a feeding trough, or a head of the bovine is not lowered.

11. The method according to claim 1, further comprising detecting movements of the muzzle of the bovine to identify chewing of food.

12. The method according to claim 1, further comprising providing a radar sensor, wherein measurements provided by the radar sensor and/or said the at least one water detection sensor are acquired over time to determine a duration of water consumption or feeding of the bovine.

13. The method according to claim 1, wherein measurements are processed by a central unit worn by the bovine, or are transmitted, via a wireless communication protocol, to a remote central unit.

14. The method according to claim 1, further comprising delivering one or more active compounds using the nose ring.

15. The method according to claim 1, wherein the bovine is a cow.

16. The method according to claim 14, wherein the one or more active compounds comprise medication and/or vitamins.

17. The method according to claim 13, wherein the central unit is a microprocessor.

* * * * *